(12) United States Patent
Fu et al.

(10) Patent No.: US 11,580,647 B1
(45) Date of Patent: Feb. 14, 2023

(54) GLOBAL AND LOCAL BINARY PATTERN IMAGE CRACK SEGMENTATION METHOD BASED ON ROBOT VISION

(71) Applicants: Guangzhou University, Guangzhou (CN); Zhongkai University of Agriculture Engineering, Guangzhou (CN); Guangzhou Guangjian Construction Engineering Testing Center Co., Ltd., Guangzhou (CN); GuangZhou Cheng'an Testing LTD. of Highway & Bridge, Guangzhou (CN)

(72) Inventors: Jiyang Fu, Guangzhou (CN); Airong Liu, Guangzhou (CN); Zhicheng Yang, Guangzhou (CN); Jihua Mao, Guangzhou (CN); Bingcong Chen, Guangzhou (CN); Jiaming Xu, Guangzhou (CN); Yongmin Yang, Guangzhou (CN); Xiaosheng Wu, Guangzhou (CN); Jianting Cheng, Guangzhou (CN)

(73) Assignees: Guangzhou University, Guangzhou (CN); Zhongkai University of Agriculture Engineering, Guangzhou (CN); Guangzhou Guangjian Construction Engineering Testing Center Co., Ltd., Guangzhou (CN); GuangZhou Cheng'an Testing LTD. of Highway & Bridge, Guangzhou (CN)

( * ) Notice: Subject to any disclaimer, the term of this patent is extended or adjusted under 35 U.S.C. 154(b) by 0 days.

(21) Appl. No.: 17/726,149

(22) Filed: Apr. 21, 2022

(30) Foreign Application Priority Data

Dec. 24, 2021 (CN) .......................... 202111608583.2

(51) Int. Cl.
*G06T 7/11* (2017.01)
*G06T 5/00* (2006.01)
(Continued)

(52) U.S. Cl.
CPC ............... *G06T 7/11* (2017.01); *G06T 5/009* (2013.01); *G06T 7/0002* (2013.01); *G06T 7/10* (2017.01);
(Continued)

(58) Field of Classification Search
CPC ..... G06T 7/10; G06T 7/11; G06T 7/12; G06T 7/136; G06T 7/155; G06T 7/187;
(Continued)

(56) References Cited

U.S. PATENT DOCUMENTS

| | | | |
|---|---|---|---|
| 2015/0262039 A1* | 9/2015 | Ruan | ......................... G06T 7/11 |
| | | | 382/159 |
| 2017/0343481 A1* | 11/2017 | Jahanshahi | .......... G06N 3/0454 |
| 2021/0233245 A1* | 7/2021 | Xu | ......................... G06V 10/25 |

OTHER PUBLICATIONS

Yong, Hu, and Zhao Chun-Xia. "A Local Binary Pattern Based Methods for Pavement Crack Detection." Journal of Pattern Recognition Research 5.1 (2010): 140-147. (Year: 2010).*

(Continued)

*Primary Examiner* — Geoffrey E Summers
(74) *Attorney, Agent, or Firm* — Getech Law LLC; Jun Ye (57) ABSTRACT

A global and local binary pattern image crack segmentation method based on robot vision comprises the following steps: enhancing a contrast of an acquired original image to obtain an enhanced map; using an improved local binary pattern detection algorithm to process the enhanced map and construct a saliency map; using the enhanced map and the saliency map to segment cracks and obtaining a global and local binary pattern automatic crack segmentation method; and evaluating performance of the obtained global and local (Continued)

binary pattern automatic crack segmentation method. The present application uses logarithmic transformation to enhance the contrast of a crack image, so that information of dark parts of the cracks is richer. Texture features of a rotation invariant local binary pattern are improved. Global information of four directions is integrated, and the law of universal gravitation and gray and roundness features are introduced to correct crack segmentation results, thereby improving segmentation accuracy. Crack regions can be segmented in the background of uneven illumination and complex textures. The method has good robustness and meets requirements of online detection.

10 Claims, 5 Drawing Sheets

(51) Int. Cl.
    *G06T 7/10*     (2017.01)
    *G06T 7/00*     (2017.01)
    *G06V 10/46*     (2022.01)
(52) U.S. Cl.
    CPC .. *G06V 10/467* (2022.01); *G06T 2207/30132* (2013.01)
(58) Field of Classification Search
    CPC ....... G06T 7/194; G06T 5/009; G06T 7/0002; G06T 7/0004; G06T 7/0008; G06T 2207/30132; G06V 10/26; G06V 10/267; G06V 30/148; G06V 30/15; G06V 10/462; G06V 10/464; G06V 10/467; G06V 30/18143; G06V 30/18152; G06V 30/18133; G06K 9/00
    USPC ......................................................... 382/173
    See application file for complete search history.

(56) References Cited

OTHER PUBLICATIONS

Cubero-Fernandez, A., et al. "Efficient pavement crack detection and classification." EURASIP Journal on Image and Video Processing 2017.1 (2017): 1-11. (Year: 2017).*
Kumar, Jayendra, et al. "LBP riu2 Features for Classification of Radiographic Weld Images." 2019 International Conference on Innovative Trends and Advances in Engineering and Technology (ICITAET). IEEE, 2019. (Year: 2019).*
Xie, Xiaomin, et al. "The multichannel integration active contour framework for crack detection." International Journal of Advanced Robotic Systems 16.3 (2019): 1729881419852853. (Year: 2019).*
Xu, Wei, et al. "Pavement crack detection based on saliency and statistical features." 2013 IEEE International Conference on Image Processing. IEEE, 2013. (Year: 2013).*

\* cited by examiner

GLOBAL AND LOCAL BINARY PATTERN IMAGE CRACK SEGMENTATION METHOD BASED ON ROBOT VISION

TECHNICAL FIELD

The present invention relates to the technical field of crack detection, in particular to a global and local binary pattern image crack segmentation method based on robot vision.

BACKGROUND

In a traditional image crack segmentation method, the uneven degree of cracks, the contrast difference between the surrounding background and cracks, shadows and other interference will all have a great impact on image crack segmentation results. Moreover, a traditional crack detection method is mainly manual detection, wherein cracks are observed with naked eyes and the efficiency is low. With the development of science and technology, robot vision technology is slowly replacing the traditional vision technology. Robot vision is a system integrating computer, machinery, sensing technology, information processing technology, image processing technology and other technologies. At present, most intelligent robots have a visual acquisition function, and can realize operations such as matching and processing of collected images. If the robot vision technology can be applied to crack segmentation field, it will greatly improve the efficiency and accuracy of image crack segmentation. Moreover, for some special occasions, such as underwater work, robot vision can better replace manual detection. However, in the prior art, an image crack segmentation method based on robot vision is still immature and cannot completely overcome defects of traditional crack segmentation methods.

SUMMARY

In order to overcome disadvantages of the prior art, the present application aims to provide a global and local binary pattern image crack segmentation method based on robot vision, aiming at solving at least one of the above technical problems.

In a first aspect, the present application provides a global and local binary pattern image crack segmentation method based on robot vision, including:

enhancing a contrast of an acquired original image to obtain an enhanced map;

using an improved local binary pattern detection algorithm to process the enhanced map and construct a saliency map;

using the enhanced map and the saliency map to segment cracks and obtaining a global and local binary pattern automatic crack segmentation method; and evaluating performance of the obtained global and local binary pattern automatic crack segmentation method.

In a second aspect, the present application further provides a global and local binary pattern image crack segmentation apparatus based on robot vision, including:

an image enhancement unit, configured to enhance a contrast of an acquired original image to obtain an enhanced map;

a saliency map construction unit, configured to use an improved local binary pattern detection algorithm to process the enhanced map and construct a saliency map;

a segmentation algorithm acquisition unit, configured to use the enhanced map and the saliency map to segment cracks and obtain a global and local binary pattern automatic crack segmentation method; and a performance evaluation unit, configured to evaluate performance of the obtained global and local binary pattern automatic crack segmentation method.

In a third aspect, the present application further provides a computer device which includes a memory, a processor, and a computer program stored on the memory and operable on the processor, wherein, when the processor executes the computer program, the global and local binary pattern image crack segmentation method based on robot vision according to the first aspect is realized.

In a fourth aspect, the present application further provides the computer readable storage medium stores a computer program, and when the computer program is executed by a processor, the processor is enabled to execute the global and local binary pattern image crack segmentation method based on robot vision according to the first aspect.

The global and local binary pattern image crack segmentation method based on robot vision uses logarithmic transformation to enhance the contrast of a crack image, so that information of dark parts of the cracks is richer. Texture features of a rotation invariant local binary pattern are improved. Global information of four directions is integrated to generate the crack saliency map. Finally, the law of universal gravitation and gray and roundness features are introduced to correct crack segmentation results, thereby improving segmentation accuracy. With the method, crack regions can be segmented in the background of uneven illumination and complex textures. The method has good robustness and meets requirements of online detection.

BRIEF DESCRIPTION OF DRAWINGS

In order to more clearly explain the technical scheme of embodiments of the present application, accompanying drawings required for use in description of the embodiments will be briefly described below. It is apparent that the drawings in the following description are some of the embodiments of the present application from which other drawings may be obtained without creative effort by those of ordinary skill in the art.

DETAILED DESCRIPTION OF EMBODIMENTS

Specific implementations of the present invention will be further explained below with reference to the accompanying drawings. It should be noted here that the description of these implementations is intended to help understand the present invention, but is not intended to limit the present invention. In addition, technical features involved in each of the implementations of the present invention described below can be combined with each other as long as they do not conflict with each other.

Figure 1:
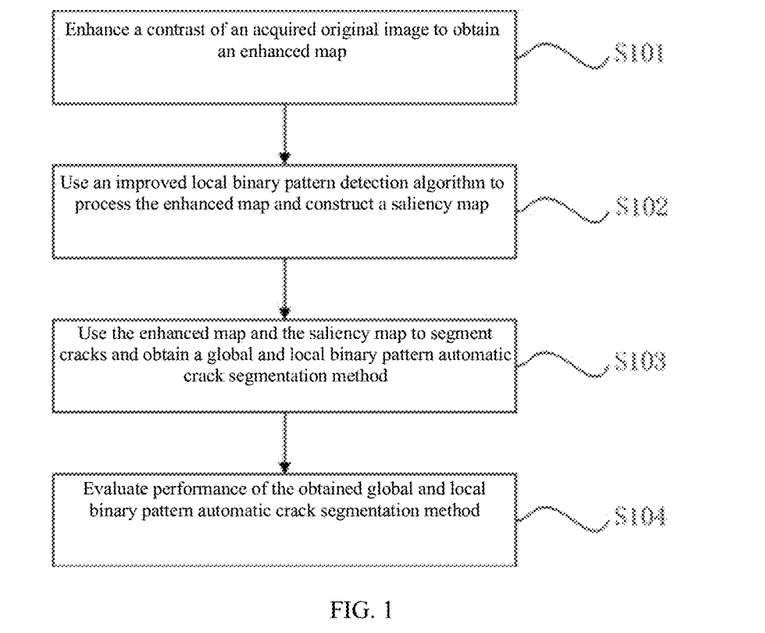
FIG. 1 is a flow chart of a global and local binary pattern image crack segmentation method based on robot vision provided by an embodiment of the present application.

As shown in FIG. 1, a flow chart of a global and local binary pattern image crack segmentation method based on robot vision provided by an embodiment includes:

S101, a contrast of an acquired original image is enhanced to obtain an enhanced map.

Figure 2:
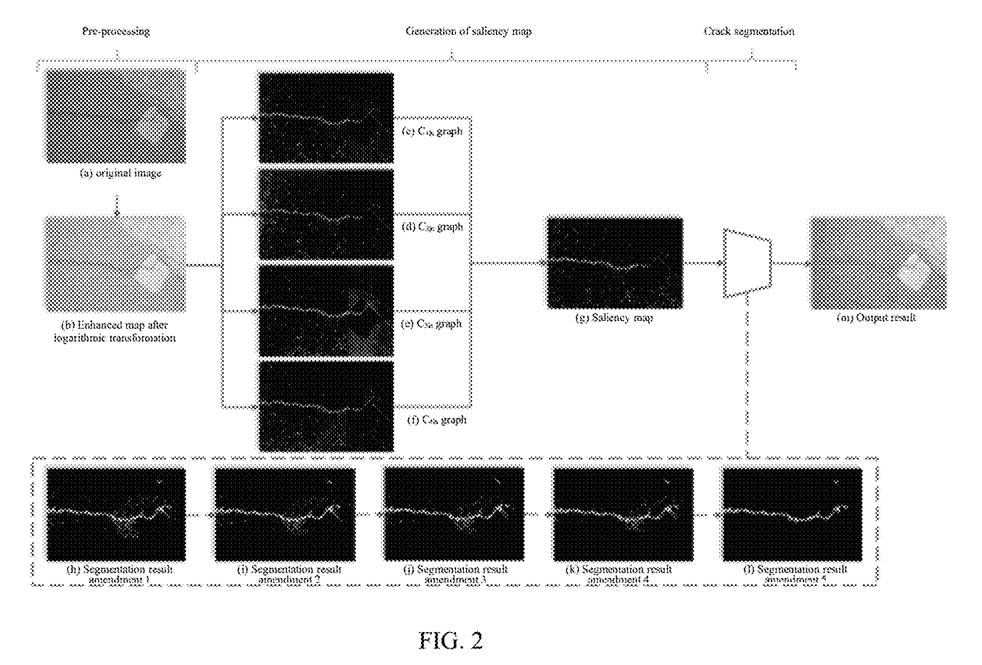
FIG. 2 is a frame diagram of a global and local binary pattern image crack segmentation method based on robot vision provided by an embodiment of the present application.

As shown in FIG. 2a, the gray value of a crack region is lower than that of the background, and a main region of concern is a part with low gray value. Therefore, logarithmic transformation is used to expand the gray range of dark crack defects, so that the image shows more low gray details. According to minimum and maximum gray values of the transformed image, the gray range of the image is mapped to 0-255, so as to realize contrast enhancement between the crack and the background. As shown in FIG. 2b, the enhanced map is denoted as G, and the contrast between the crack and the background is enhanced by preprocessing the original image.

S102, an improved local binary pattern detection algorithm is used to process the enhanced map and construct a saliency map.

Local Binary Patterns (LBP) are mainly used to describe local texture features. In order to better explain a global and local binary pattern saliency map algorithm proposed in the present application, a rotation invariant local binary pattern algorithm is first explained.

In the algorithm, any pixel on the image will be compared with its adjacent pixel set in turn to calculate a local binary pattern code:

$$C|_n = \sum_{i=0}^{n-1} 2^i F(g_i - g_t) \quad F(x) = \begin{cases} 1, x \geq 0 \\ 0, x < 0 \end{cases}, \quad (1)$$

Where: C is a LBP code, $g_t$ is a gray value of a target pixel $p_t$, $g_i$ is a gray value of the i-th adjacent pixel $p_i$, and n is the total number of adjacent pixels.

Thus, the rotation invariant local binary pattern code obtained is:

$$IRC|_{n,r} = \min \left\langle B2D\{Rot[D2B(C),j]\}|_{j \in [0, n-1]} \right\rangle \quad (2)$$

Where: IRC is a rotation invariant local binary pattern code, B2D denotes conversion of a binary system to a decimal system, D2B means conversion of the decimal system to the binary system, Rot (x, j) means performing j times of cyclic bitwise rotation on the binary value x, and min means taking a minimum value.

Although the rotation invariant LBP depiction of local features is applied to texture detection, it is difficult to use such feature result for defect detection, because detection results are affected by the distance from the target pixel to the adjacent pixel $$r = \sqrt{(p_i - p_t)^2}.$$

When r is less than one-half of the shortest distance of the defect or when r is much greater than the shortest distance of the defect, the IRC of the pixel located inside the defect is almost the same as that of the pixel located in the background, which will lead to more false negatives and false positives in the detection results. In most cases, the algorithm can only detect rough defect edges.

Figure 3:
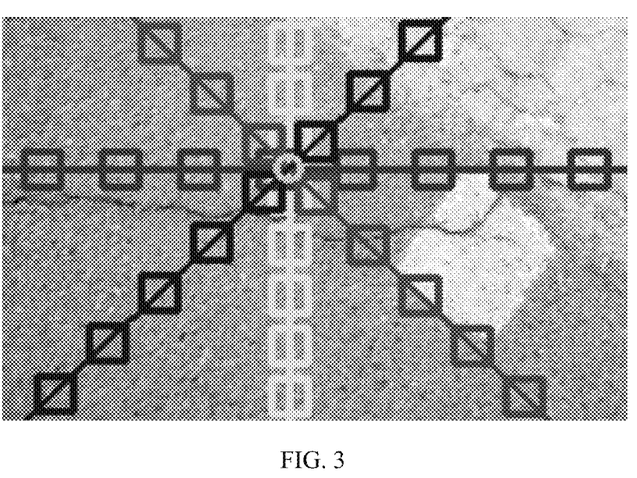
FIG. 3 is a schematic diagram of an improved local binary pattern method provided by an embodiment of the present application.

As shown in FIG. 3, a hollow circle in the middle denotes a target pixel, a square frame denotes adjacent pixels, and four straight lines composed of square frames denote four different directions: a horizontal direction, a vertical direction and diagonal directions.

In each direction, the target pixel will be compared with n points in its direction, and the comparison rule is consistent with the original local binary pattern. In this paper, taking n=8, the gray range of the image is controlled at [0, 255]. The gray values of these n points can be replaced by a 7×7 rectangular domain gray mean, thereby reducing the influence of noise. The threshold constant value 0 in formula (1) is set as a relative threshold $T_R$, namely:

$$C_d|_n = \sum_{i=0}^{n-1} 2^i F(g_i - g_t) \quad F(x) = \begin{cases} 1, x \geq T_R \\ 0, x < T_R \end{cases}, \quad (3)$$

Where: d denotes the above four directions, d=1 is the upper left diagonal direction, d=2 is the horizontal direction, d=3 is the vertical direction, and d=4 is the lower left diagonal direction.

Thus, each target pixel has four $IRC_d$ values i.e. four rotation invariant local binary pattern detection patterns in different directions as shown in FIG. 2c to FIG. 2f. Its average is taken as a saliency map, as shown in FIG. 2g, which is denoted as S. It can be seen from the figure that the complex background is filtered out, and cracks are obvious, but there is still some discrete noise, so third crack segmentation and correction are needed.

Figure 4:
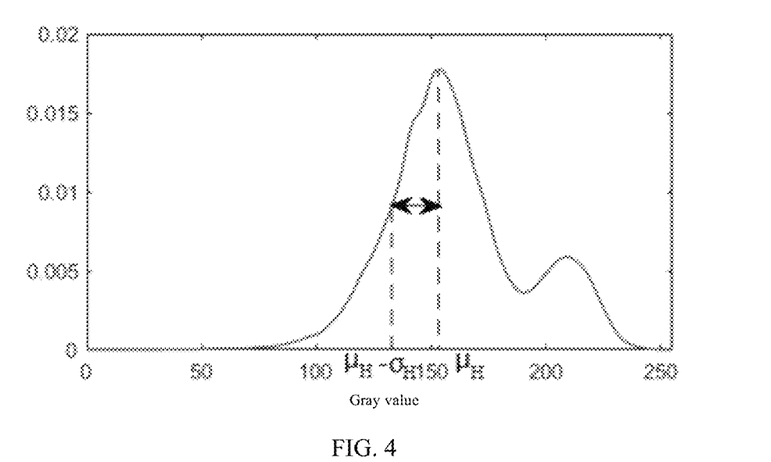
FIG. 4 is a gray histogram of a preprocessed image provided by an embodiment of the present application.

It is worth noting that the relative threshold $T_R$ is determined by a gray histogram of the contrast-enhanced map. As shown in FIG. 4, a largest hump is locked first, which is a Gaussian-like distribution[15]

$$y = (1/\sqrt{2\pi\sigma_H})e^{(x-\mu_H)^2/2\sigma_H^2} \quad (4)$$

Where: $\mu_H$ is a gray value corresponding to the maximum value of Gaussian-like curve, and $\sigma_H$ is the standard deviation of Gaussian-like curve.

According to Gaussian distribution, the probability of background appearance is in the middle of Gaussian distribution, while defects always appear at both ends, so it is necessary to roughly calculate the background gray range. As shown in the diagram, the place below the waist may be affected by noise. Therefore, by deriving the Gaussian-like curve, the position where the first derivative of the left part, namely $\mu_H - \sigma_H$, of the gray value $\mu_H$ corresponding to the maximum value of function y is 0 is obtained. Because the crack is a dark defect and the Gaussian-like distribution is considered to be symmetrical, it is only necessary to calculate one side, and then make the relative threshold $T_R = \alpha \sigma_H$ The improved local binary pattern algorithm is designed for crack detection, which not only inherits local characteristics of the original local binary pattern, but also takes into account global information.

S103, cracks are segmented by using the enhanced map and the saliency map, and a global and local binary pattern automatic crack segmentation method is obtained.

In crack segmentation, roundness Cir is used as a feature of crack based on a permeability model[9]

$$Cir = \frac{A_{Reg}}{\pi D_{Reg}^2} \quad (5)$$

Where: $A_{Reg}$ denotes the number of pixels of a region Reg, and $D_{Reg}$ denotes the maximum distance from the center to the edge of the region.

If the region is circular, Cir=1; if the region is hollow or very long, Cir<1. At the same time, based on the law of universal gravitation, it is considered that the larger the area of crack region, the larger the influence range of its endpoint on nearby points, that is $$R_{Reg} = \sqrt{kA_{Reg}} \quad (6)$$

Where: $R_{Reg}$ denotes the radius of influence of the region, and k is a coefficient of change.

Based on the above characteristics, the following crack segmentation program is designed:

Input: Enhanced map G, saliency map S, image width and height W and H, and parameter k.

Output: Output Image O.

1) Initialization: making Image I=S, target area $A_T$=H×W, and flag Flag=0.

While (True):

2) A 0 Matrix M of H×W is generated.

3) If Flag=0, threshold segmentation is performed on I, a potential crack region is extracted, the mean value $\mu_I$ and standard deviation $\sigma_I$ of I are calculated; when the pixel gray value in I is greater than or equal to $\mu_I+\lambda\sigma_I$, the corresponding position in O is set to 1; otherwise, it is set to 0; if Flag=1, O=I.

4) The area of the crack region is calculated: $A_{crack}=\Sigma_{O=1}$.

5) If the condition $A_{crack}=A_T$ or k=0 is met, the result O is output; otherwise, $A_T=A_{crack}$ and step 6) is carried out.

6) Connectivity analysis is carried out on the region with a median of O of 1: $\cup Reg_i=\Sigma_{O==1}$. If Flag=1, the region with the area greater than or equal to 3 and roundness less than or equal to 0.4 will be preserved, that is:

$$Reg_i = Reg_i \mid_{A_{Regi} \geq 3 \& Cir_{Regi} \leq 0.4}.$$

7) Skeleton extraction is performed on Reg, and all its endpoints $EP_i=(x_1, y_1), \ldots, (x_j, y_j), \ldots, (x_m, y_m)$ are obtained, where m is the sum of the number of each skeleton endpoint.

8) The gray average value $Gm_{Regi}$ in G for each region and the influence radius for each region are calculated according to formula (6)

$$R_i = \sqrt{kA_{Regi}}.$$

9) For the neighborhood pixel set of each endpoint $(x_j, y_j)$ in $Reg_i$ pixels satisfying the gray scale range of $[Gm_{Regi}-\delta, Gm_{Regi}+\delta]$ in G are merged with $Reg_i$.

10) If the corresponding region of the expanded $Reg_i$ satisfies $Cir_{Regi} \leq 0.1$, the relevant region is set to 1.

11) I=M and k-- are set, and step 2) is returned to.

End While

S104, performance of the obtained global and local binary pattern automatic crack segmentation method is evaluated.

In order to evaluate the performance of the proposed global and local binary pattern automatic crack segmentation method (GLBPCS), tests are carried out on a public crack data set (https://github.com/cuilimeng/CrackForest), detection results are compared with the controllable evidence filtering method (SEF method), the width transformation method (WT method), the permeating algorithm (P method), and the improved U-shaped convolution neural network method (Unet++ method). Performance indexes are respectively expressed by coincidence rate $D_c$, (that is, coincidence rate between a real value and a predicted value), accuracy rate $P_r$ (that is, a ratio of a correct number of defect pixels to a total predicted defect value), recall rate $R_e$ (that is, ratio of a correct number of defect pixels to a total real defect values) and running time.

$$D_c = \frac{2TP}{2TP+FN+FP} \quad (7)$$

$$P_r = \frac{TP}{TP+FP} \quad (8)$$

$$R_e = \frac{TP}{TP+FN} \quad (9)$$

Where: TP denotes the number of pixels in which both the true value and the predicted value are defects, FP denotes the number of pixels in which the true value is background but the predicted value is defect, and FN denotes the number of pixels in which the true value is defect but the predicted value is background.

Figure 5:
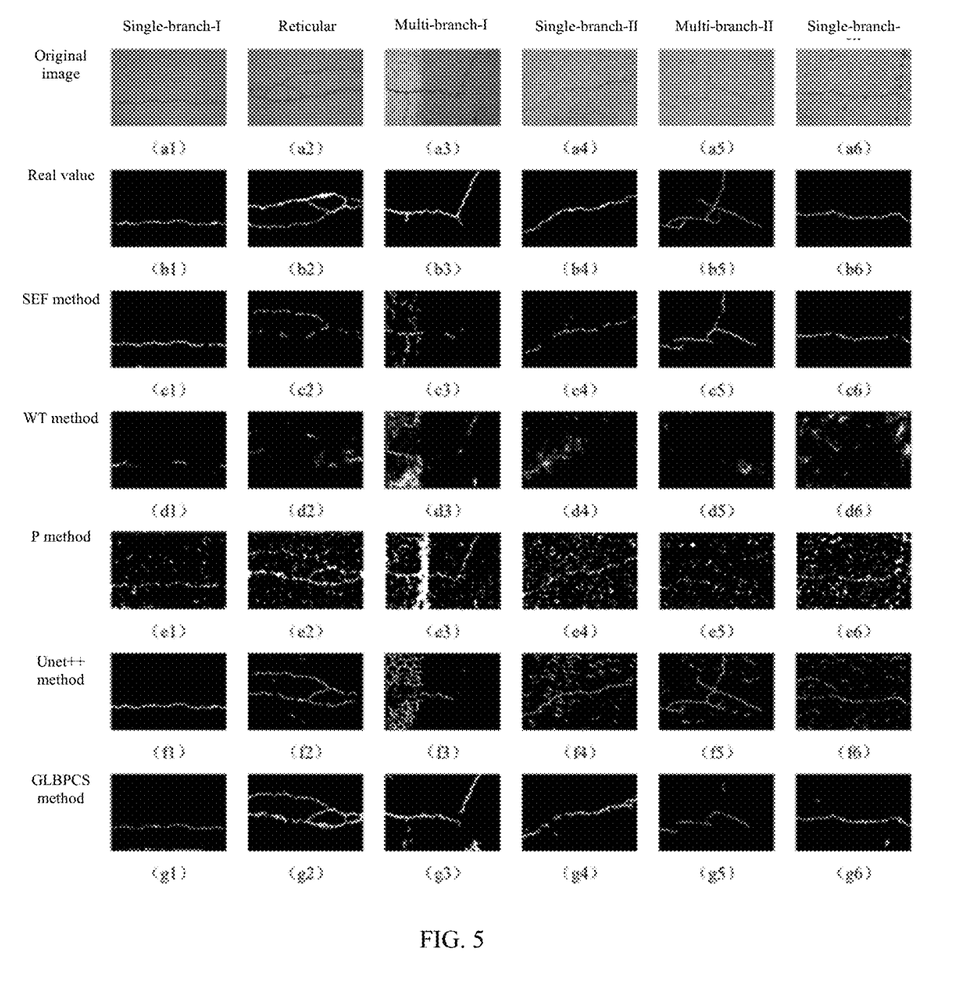
FIG. 5 is a schematic diagram of detection results of a disclosed crack data set by different methods provided by an embodiment of the present application.
Figure 6A:
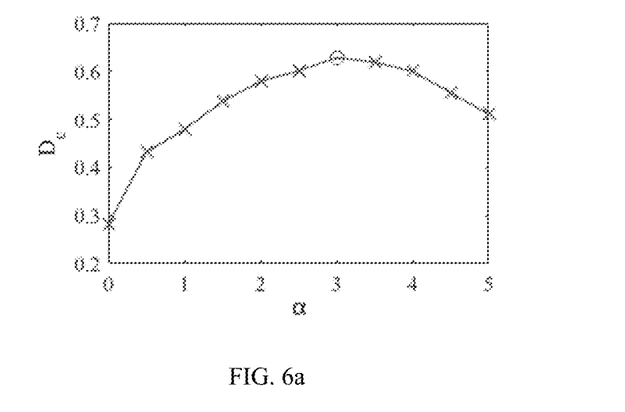
FIGS. 6a-6d are parameter adaptive configuration diagrams of GLBPCS provided by an embodiment of the present application.
Figure 6B:
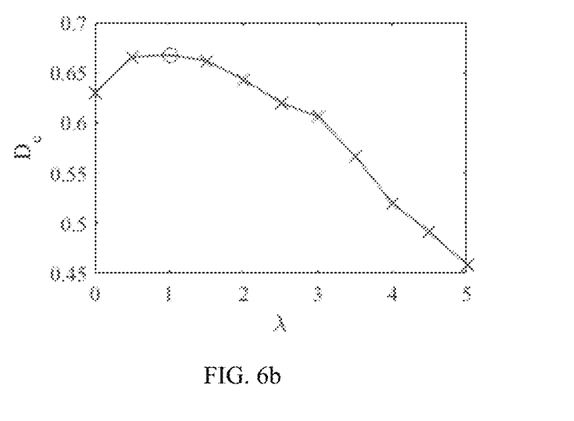
Figure 6C:
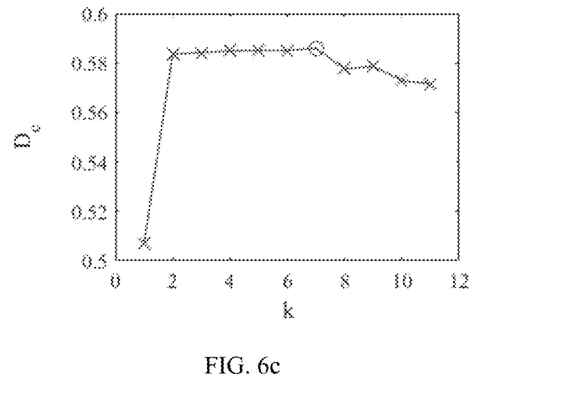
Figure 6D:
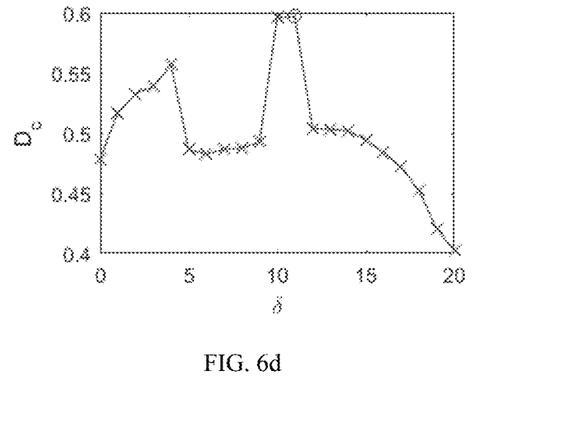

The disclosed crack data set contains 118 480×320 three-channel images, as shown in FIG. 5, where the detection results of original image (FIG. 5a), true value (FIG. 5b), SEF (FIG. 5c), WT (FIG. 5d), P (FIG. 5e), Unet++ (FIG. 5f) and GLBPCS (FIG. 5g) are respectively from top to bottom. Different types of crack shapes are selected for analysis in the original image. For example, FIGS. 4a1, 5a4 and 5a6 all show single-branch cracks, FIGS. 5a3 and 5a5 show multi-branch cracks, and FIG. 5a2 shows reticular cracks. At the same time, the image also includes the influence of noise, such as existence of paint in FIG. 5a3 and existence of oil spots in FIG. 5a6. Therefore, the data set is equally divided into a training set and a test set, and GLBPCS adopts an adaptive method to configure parameters specifically in a way of selecting 5 samples arbitrarily from the training set to calculate $D_c$ to adjust each parameter to obtain optimal results. The program automatically generates four curve graphs, namely, the relationship between threshold coefficient $\alpha$, standard deviation coefficient $\lambda$, change coefficient k, allowable gray scale change range $\delta$ and coincidence rate $D_c$. As shown in FIG. 6, the program automatically selects the values corresponding to the average maximum $D_c$, namely $\alpha=3$, $\lambda=1$, k=7, and $\delta=11$. In view the balance between algorithm accuracy and running time, k is fine-tuned to 5.

In an embodiment, after the results are obtained, experimental results need to be evaluated.

The present application evaluates the experimental results from two aspects: visual comparison and quantitative analysis.

For the SEF method, as shown in FIG. 5c, the method can detect various types of cracks, but its detection effect is limited by the size of a filter core. When the core is large, the method can detect wider cracks, while when the core is small, it can detect narrower cracks. For the WT method, as shown in FIG. 5d, the detection effect of this method is poor, and it is almost impossible to identify the characteristics of cracks because the method relies on the edge extraction effect. For the position where the transition between cracks and background is smooth, the edge extraction may fail, resulting in the failure or error of edge point pair search. For the P method, as shown in FIG. 5e, the method has a general effect on defect extraction in complex background, and can achieve better results only when the background is relatively pure and there is no too much noise interference. For the Unet++ method, as shown in FIG. 5f, the method can basically completely extract the crack region, mainly due to millions of sample parameters. Nevertheless, it also introduces more false positive regions. For the GLBPCS method proposed in this paper, as shown in FIG. 5g, the method can detect the crack region well without introducing too many false positives, mainly because the improved LBP algorithm combines global and local information, and the modified algorithm introduces the theory of universal gravitation and roundness features, so that the crack features can be extracted well.

Figure 7:
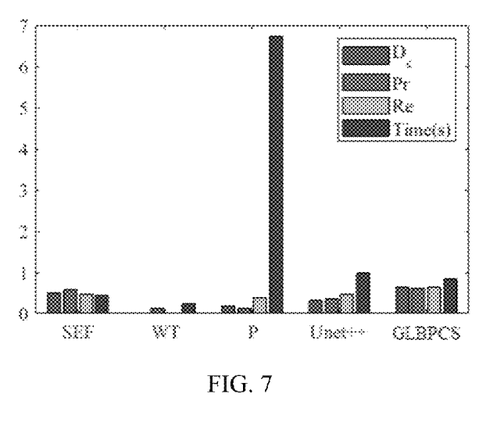
FIG. 7 is a histogram of quantitative analysis of detection results of different methods provided by an embodiment of the present application.

FIG. 7 shows the quantitative analysis results of different crack detection methods. Because the true value is artificially marked and there are subjective factors, the detection effect of the algorithm is considered to be better when the three indexes $D_c$, $P_r$ and $R_e$ are greater than or equal to 0.5. As shown in the diagram, the three indexes of the proposed method are all over 0.6, and the detection effect is better than other methods. Although its detection speed is slower than those of the SEF method and WT method, it can still meet the requirements of online detection within 1 s.

The present application provides an automatic segmentation method for cracks in a concrete structure. Logarithmic transform is used to enhance the contrast of crack image, which makes information of dark parts of the cracks richer. Texture features of a rotation invariant local binary pattern are improved. Global information of four directions is integrated to generate the crack saliency map. Finally, the law of universal gravitation and gray and roundness features are introduced to correct crack segmentation results, thereby improving segmentation accuracy. With the method, crack regions can be segmented in the background of uneven illumination and complex textures. The method has good robustness and meets requirements of online detection.

In an embodiment, the present application further provides a global and local binary pattern image crack segmentation apparatus based on robot vision, including:
an image enhancement unit, configured to enhance a contrast of an acquired original image to obtain an enhanced map;
a saliency map construction unit, configured to use an improved local binary pattern detection algorithm to process the enhanced map and construct a saliency map;
a segmentation algorithm acquisition unit, configured to use the enhanced map and the saliency map to segment cracks and obtain a global and local binary pattern automatic crack segmentation method; and
a performance evaluation unit, configured to evaluate performance of the obtained global and local binary pattern automatic crack segmentation method.

In an embodiment, the present application further provides a computer device which includes a memory, a processor, and a computer program stored on the memory and operable on the processor, wherein, when the processor executes the computer program, the global and local binary pattern image crack segmentation method based on robot vision according any one of the above embodiments is realized.

In an embodiment, the present application further provides the computer readable storage medium stores a computer program, and when the computer program is executed by a processor, the processor is enabled to execute the global and local binary pattern image crack segmentation method based on robot vision according to any one of the above embodiments.

Implementations of the present invention have been described in detail above with reference to the accompanying drawings, but the present invention is not limited to the described implementations. Various changes, modifications, substitutions and modifications made by those skilled in the art to these implementations without departing from the principles and spirit of the present invention still fall into the scope of protection of the present invention.

The invention claimed is:

1. A global and local binary pattern image crack segmentation method based on robot vision, comprising:
enhancing a contrast of an acquired original image to obtain an enhanced map;
using a modified local binary pattern detection algorithm to process the enhanced map and construct a saliency map, wherein the using the modified local binary pattern algorithm further includes:
calculating a rotation invariant local binary pattern code of each pixel by comparing with adjacent pixels in four directions,
obtaining four rotation invariant local binary pattern detection patterns, and
averaging the four rotation invariant local binary pattern detection patterns to obtain the saliency map, wherein the rotation invariant local binary pattern code of each pixel is calculated based on a gray value of a target pixel, gray values of the adjacent pixels, a count of the adjacent pixels, and a relative threshold determined by fitting a Gaussian-like distribution curve to a gray histogram of the enhanced map;
using the enhanced map and the saliency map to segment cracks and obtaining a global and local binary pattern automatic crack segmentation method; and
evaluating performance of the obtained global and local binary pattern automatic crack segmentation method.

2. The global and local binary pattern image crack segmentation method based on robot vision according to claim 1, wherein the enhancing a contrast of an acquired original image to obtain the enhanced map comprises:
using logarithmic transformation to expand a gray range of relatively dark crack defects to obtain the enhanced map.

3. The global and local binary pattern image crack segmentation method based on robot vision according to claim 1, wherein the using the modified local binary pattern detection algorithm to process the enhanced map and construct a saliency map comprises:
according to changes of all pixels in the original image in horizontal, vertical and two diagonal directions, calculating a rotation invariant local binary pattern code of each pixel, and obtaining the saliency map according to the rotation invariant local binary pattern code of each pixel.

4. The global and local binary pattern image crack segmentation method based on robot vision according to claim 3, wherein prior to obtaining the saliency map according to the rotation invariant local binary pattern code of each pixel, the method comprises:

processing the enhanced map to obtain a gray histogram of the enhanced map.

5. The global and local binary pattern image crack segmentation method based on robot vision according to claim 1, wherein the evaluating performance of the obtained global and local binary pattern automatic crack segmentation method comprises:

testing the global and local binary pattern automatic crack segmentation method on an open crack data set, and comparing test results to obtain performance evaluation results.

6. The global and local binary pattern image crack segmentation method based on robot vision of claim 1, wherein the rotation invariant local binary pattern code of each pixel is calculated as follows:

$$C_d|_n = \sum_{i=0}^{n-1} 2^i F(g_i - g_t) \quad F(x) = \begin{cases} 1, x \geq T_R \\ 0, x < T_R \end{cases},$$

wherein C is a local binary pattern code, $g_t$ is the gray value of the target pixel $p_t$, $g_i$ is a gray value of the i-th adjacent pixel $p_i$, n is the count of adjacent pixels, d denotes the four directions, d=1 is the upper left diagonal direction, d=2 is the horizontal direction, d=3 is the vertical direction, and d=4 is the lower left diagonal direction, and $T_R$ is the relative threshold determined by fitting a Gaussian-like distribution curve to a gray histogram of the enhanced map.

7. The global and local binary pattern image crack segmentation method based on robot vision of claim 6, wherein the Gaussian-like distribution curve is determined as follows:

$$y = (1/\sqrt{2\pi\sigma_H}) e^{(x-\mu_H)^2/2\sigma_H^2}$$

where: $\mu_H$ is a gray value corresponding to a maximum value of the Gaussian-like distribution curve, $\sigma_H$ is a standard deviation of the Gaussian-like distribution curve; and, the relative threshold $T^R = \alpha \sigma_H$, where $\alpha$ is a threshold coefficient.

8. A global and local binary pattern image crack segmentation apparatus based on robot vision, comprising:

an image enhancement unit, configured to enhance a contrast of an acquired original image to obtain an enhanced map;

a saliency map construction unit, configured to use a modified local binary pattern detection algorithm to process the enhanced map and construct a saliency map, wherein the saliency map construction unit is further configured to:

calculate a rotation invariant local binary pattern code of each pixel by comparing with adjacent pixels in four directions, obtain four rotation invariant local binary pattern detection patterns, and average the four rotation invariant local binary pattern detection patterns to obtain the saliency map, wherein the rotation invariant local binary pattern code of each pixel is calculated based on a gray value of a target pixel, gray values of the adjacent pixels, a count of the adjacent pixels, and a relative threshold determined by fitting a Gaussian-like distribution curve to a gray histogram of the enhanced map;

a segmentation algorithm acquisition unit, configured to use the enhanced map and the saliency map to segment cracks and obtain a global and local binary pattern automatic crack segmentation method; and a performance evaluation unit, configured to evaluate performance of the obtained global and local binary pattern automatic crack segmentation method.

9. The global and local binary pattern image crack segmentation apparatus based on robot vision of claim 8, wherein the rotation invariant local binary pattern code of each pixel is calculated as follows:

$$C_d|_n = \sum_{i=0}^{n-1} 2^i F(g_i - g_t) \quad F(x) = \begin{cases} 1, x \geq T_R \\ 0, x < T_R \end{cases},$$

wherein C is a local binary pattern code, $g_t$ is the gray value of the target pixel $p_t$, $g_i$ is a gray value of the i-th adjacent pixel $p_i$, n is the count of adjacent pixels, d denotes the four directions, d=1 is the upper left diagonal direction, d=2 is the horizontal direction, d=3 is the vertical direction, and d=4 is the lower left diagonal direction, and $T_R$ is the relative threshold determined by fitting a Gaussian-like distribution curve to a gray histogram of the enhanced map.

10. The global and local binary pattern image crack segmentation apparatus based on robot vision of claim 9, wherein the Gaussian-like distribution curve is determined as follows:

$$y = (1/\sqrt{2\pi\sigma_H}) e^{(x-\mu_H)^2/2\sigma_H^2}$$

where: $\mu_H$ is a gray value corresponding to a maximum value of the Gaussian-like distribution curve, $\sigma_H$ is a standard deviation of the Gaussian-like distribution curve; and, the relative threshold $T_R = \alpha \sigma_H$, where a is a threshold coefficient.

* * * * *